United States Patent [19]
Moehring

[11] 3,938,660
[45] Feb. 17, 1976

[54] GLASS SHEET SHIPPING PACKAGES

[75] Inventor: Richard J. Moehring, Maumee, Ohio

[73] Assignee: Libbey-Owens-Ford Company, Toledo, Ohio

[22] Filed: June 27, 1974

[21] Appl. No.: 483,701

[52] U.S. Cl. ............... 206/451; 206/448; 206/454; 214/10.5 R
[51] Int. Cl.² ........................................ B65D 85/48
[58] Field of Search ........... 105/367, 466, 469, 473, 105/474, 477, 486, 488; 206/386, 442, 448–449, 451–452, 454, 521; 211/29, 41; 214/10.5 R

[56] References Cited
UNITED STATES PATENTS

| | | | |
|---|---|---|---|
| 1,772,731 | 8/1930 | Romine | 206/452 |
| 1,982,437 | 11/1934 | Knowlton | 206/451 |
| 2,004,626 | 6/1935 | Hann | 206/453 X |
| 3,147,860 | 9/1964 | Kean, Sr. et al. | 206/448 |
| 3,709,358 | 1/1973 | Andrews et al. | 206/451 |
| 3,809,234 | 5/1974 | Kurick | 214/10.5 R X |

*Primary Examiner*—William Price
*Assistant Examiner*—Steven E. Lipman
*Attorney, Agent, or Firm*—Collins, Oberlin & Darr

[57] ABSTRACT

A composite package for shipping and storing a stack of individual sheets of glass or the like, and particularly, curved automotive glass articles. The package includes a reusable rack having resilient brace members which can be adjusted both vertically and horizontally so as to accommodate articles of various sizes supported upon edge. The resilient braces and the support members of the rack are provided with multiplanar surfaces for engaging the articles whereby the rack will accommodate a variety of articles of different curvatures, dimensions, and outlines. A novel unitized tie-down apparatus comprising pressure members, pads, and adjustable straps detachably connected to the rack frame apply uniform pressure to and securely hold a stack of curved sheet articles against the resilient braces and support members of the rack.

11 Claims, 6 Drawing Figures

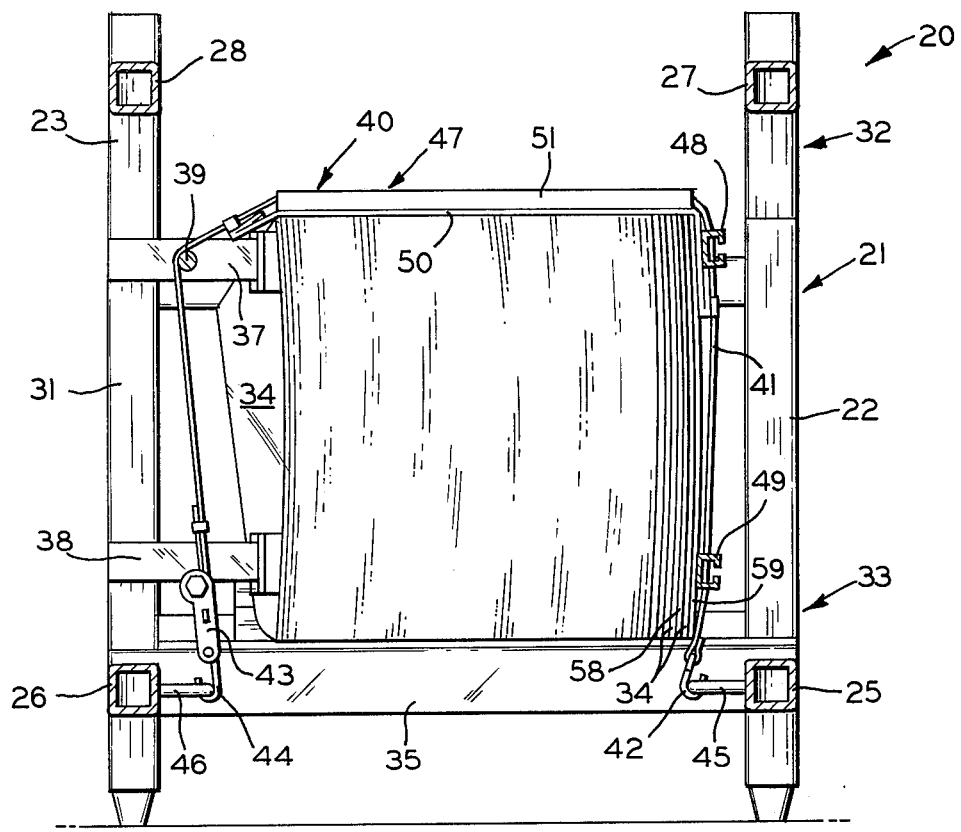
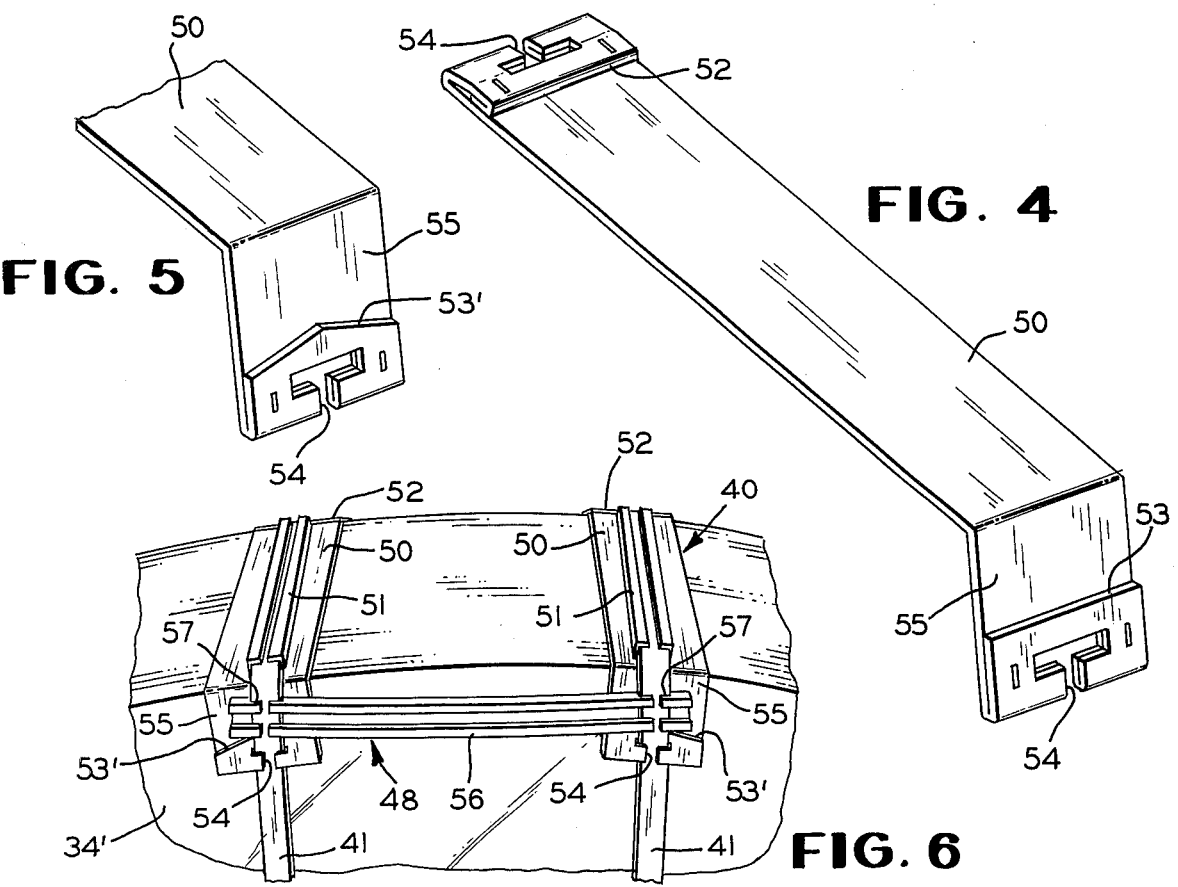

GLASS SHEET SHIPPING PACKAGES

BACKGROUND OF THE INVENTION

1. Field of the Invention

The present invention relates broadly to the transporting of sheet materials and, more particularly, to an improved package for shipping and storing a stack of individual automotive windshields or other curved glass articles.

2. Description of the Prior Art

Composite packages employing reusable racks and adjustable tie-down straps have been previously used for shipping fabricated curved glass sheets as shown, for example, by commonly assigned U.S. Pat. Nos. 3,147,860, to J. S. Kean, Sr., and 3,809,234, to J. F. Kurick. As shown in these disclosures, it was formerly common practice to merely anchor individual banding straps at their opposite ends to the rack frame and secure them over the stack of articles by buckling their respective free ends together. In such banding arrangements, a plurality of articles are simply stacked on their edges in upright position in the shipping rack and the individual glass articles of the group are separated from each other, for example, by sheets of unanchored cushioning material to prevent their marring and/or breakage in transit. Usually two individual, spaced apart banding straps are employed and each is anchored at the bottom back of the rack, passes over the top edges of the glass articles, then vertically downward over the outer surface of the stack, and is anchored at the front bottom edge of the rack. Each strap is provided with a buckle arrangement to tension the straps for holding the stack of glass articles firmly on the rack.

However, to merely secure the stack of glass articles on the rack in this manner may create certain problems, among which are the following: (1) Because of stretch or creep inherent in the material employed in the banding straps, tensioning of the individual straps normally result in non-uniform pressures being applied to the stack of glass articles; (2) It has been found in devices of this type that when individual straps are employed they can only be tensioned by application of about 25 foot-pounds of torque to secure the stack of glass sheets to the rack and that additional torquing results in breakage or cracking of some of the glass articles; and (3) After initial tensioning, the individual banding straps tend to loosen due to the aforementioned or elongation inherent in the strap material as well as slippage of the fastening devices. As a result of the reduced tension, the stack of glass articles exerts a considerable force on the banding straps when the entire package is subjected to jarring forces or impact produced by rapid changes in momentum of the transporting vehicle. These forces accelerate still further loosening of the banding straps by increased stretching of the straps and/or slippage of the fastening devices. This loosening of the banding straps may allow shifting of the stack of glass articles on the rack and result in marring and breakage of the individual windshields. Since each windshield is completely fabricated when shipped, most including a radio antenna and connecting device, damage to any portion of the unit results in loss of the entire unit and hence involves a substantial economic loss. Thus, it is desirable to tie the stack of glass articles to the rack in a more secure manner by providing a banding arrangement which applies the securing load to the glass article uniformly and with greater loading pressure than has heretofore been possible so that when any stretching or slippage of the banding strap occurs, the articles remain tightly held, thus preventing any movement of the articles relative to the rack. It has been found that the shipping package of the present invention with a novel unitized adjustable banding arrangement provides greater protection during handling and shipping of the glass articles than was heretofore possible.

SUMMARY OF THE INVENTION

Generally speaking, the shipping package of this invention comprises a combination of a known reusable shipping rack and a unitized banding arrangement. The banding arrangement includes a pair of spaced apart banding straps, each of which is threaded through the ends of a novel pad and pressure member extending across the top edges of a stack of upright curved sheets for uniformly urging the sheets in a vertical direction against the base of the rack. Further, each banding strap is threaded through an end of an upper and lower pressure member which extends horizontally across the front face of the stack for tying the banding straps together and uniformly urging the stack against the back of the shipping rack.

OBJECTS AND ADVANTAGES

It is therefore an object of this invention to provide a reusable shipping package which is adapted to safely contain a relatively large number of curved glass articles during the transportation and storage thereof.

Another object is to provide such a package which will resiliently yet firmly support and hold the articles by means of a unitized network of banding straps so as to prevent movement and resulting breakage.

Another object of the invention is to provide a package which is adjustable so as to accommodate articles of different sizes.

Still another object is to provide a package with bottom and end supports and pressure members having glass article contacting surfaces lying in more than one plane so as to accommodate a variety of units with different curvatures and peripheral configurations.

Other objects and advantages of the invention will become more apparent during the course of the following description when taken in connection with the accompanying drawings.

BRIEF DESCRIPTION OF THE DRAWINGS

In the drawings, wherein like numerals are employed to designate like parts throughout the same:

FIG. 3 is an elevational sectional view taken substantially along line 3—3 of FIG. 2;

FIG. 4 is an enlarged perspective view of the pad employed in the novel banding arrangement shown in FIG. 1;

FIG. 5 is an enlarged fragmentary perspective view of a modified form of the pad shown in FIG. 4; and FIG. 6 is a fragmentary front view of a shipping package employing the pad shown in FIG. 5.

DESCRIPTION OF THE PREFERRED EMBODIMENTS

Although not restricted thereto, the shipping package of this invention is particularly adapted to the transportation of curved glass sheets such as windshields or rear windows of automobiles or trucks. Automobile windshields are generally curved throughout their length, while truck windshields are more flat in the central region with sharper curves at the ends. To accommodate these various windshield configurations, the supporting and bracing members of the shipping rack employed therein are provided with multi-planar surfaces, that is, surfaces having flat portions angularly disposed to one another. The rack itself comprises a rigid metal frame and by the use of a resilient covering on all supporting members, a high level of protection is provided for glass units therewithin. In addition to having multi-planar surfaces, the braces supporting the windshields are adjustable vertically and horizontally in order that the rack can accommodate units of various sizes. To secure the windshields to the rack, a tie-down apparatus having a pair of spaced apart banding straps anchored to the bottom of the frame, applies pressure in both the vertical and horizontal directions through pressure members to the windshields for holding them against the supporting and bracing members of the rack.

Figure 1:
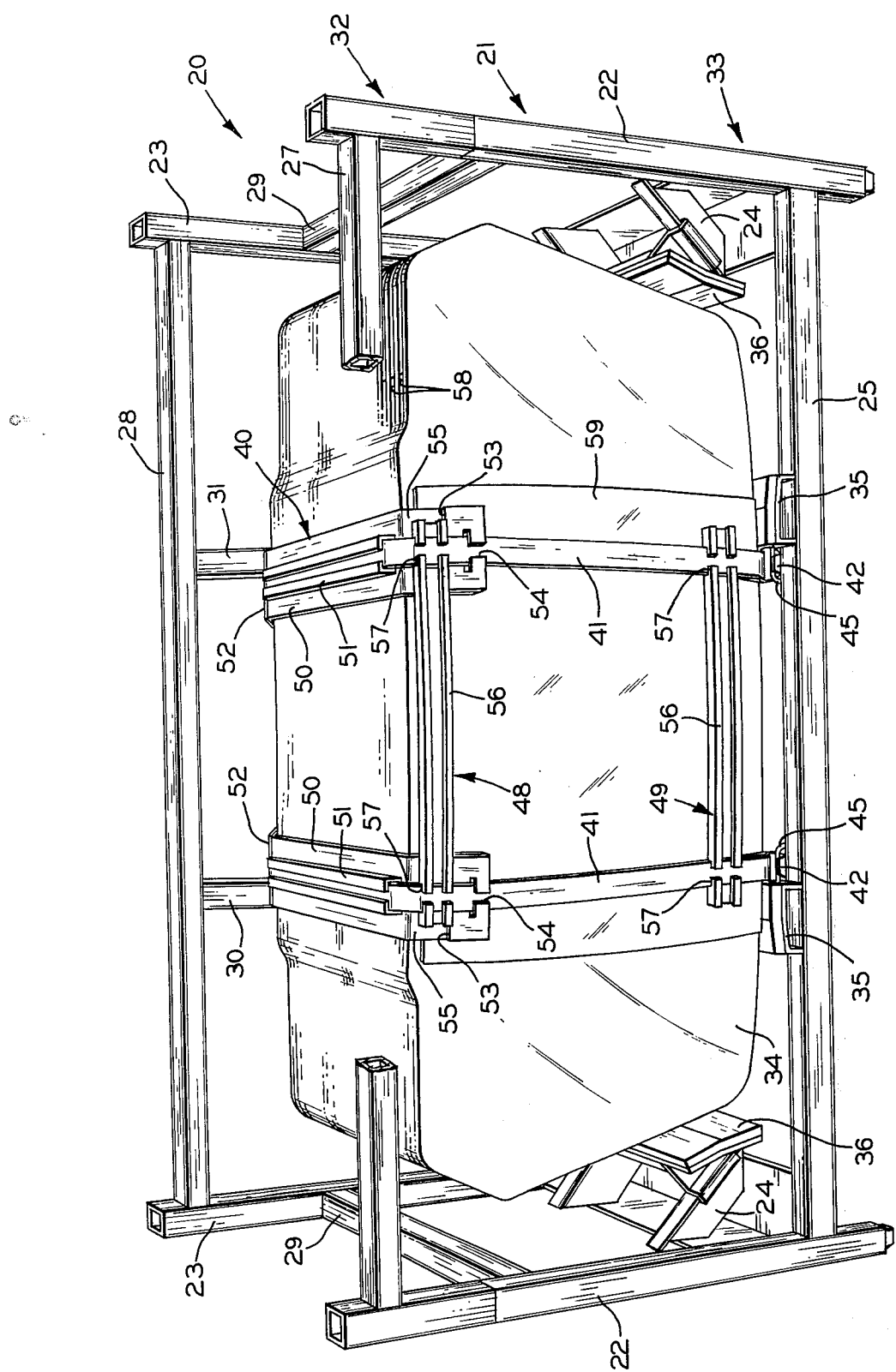
FIG. 1 is a front perspective view of a shipping package constructed in accordance with the present invention with the removable front section of the frame removed from the rack.
Figure 2:
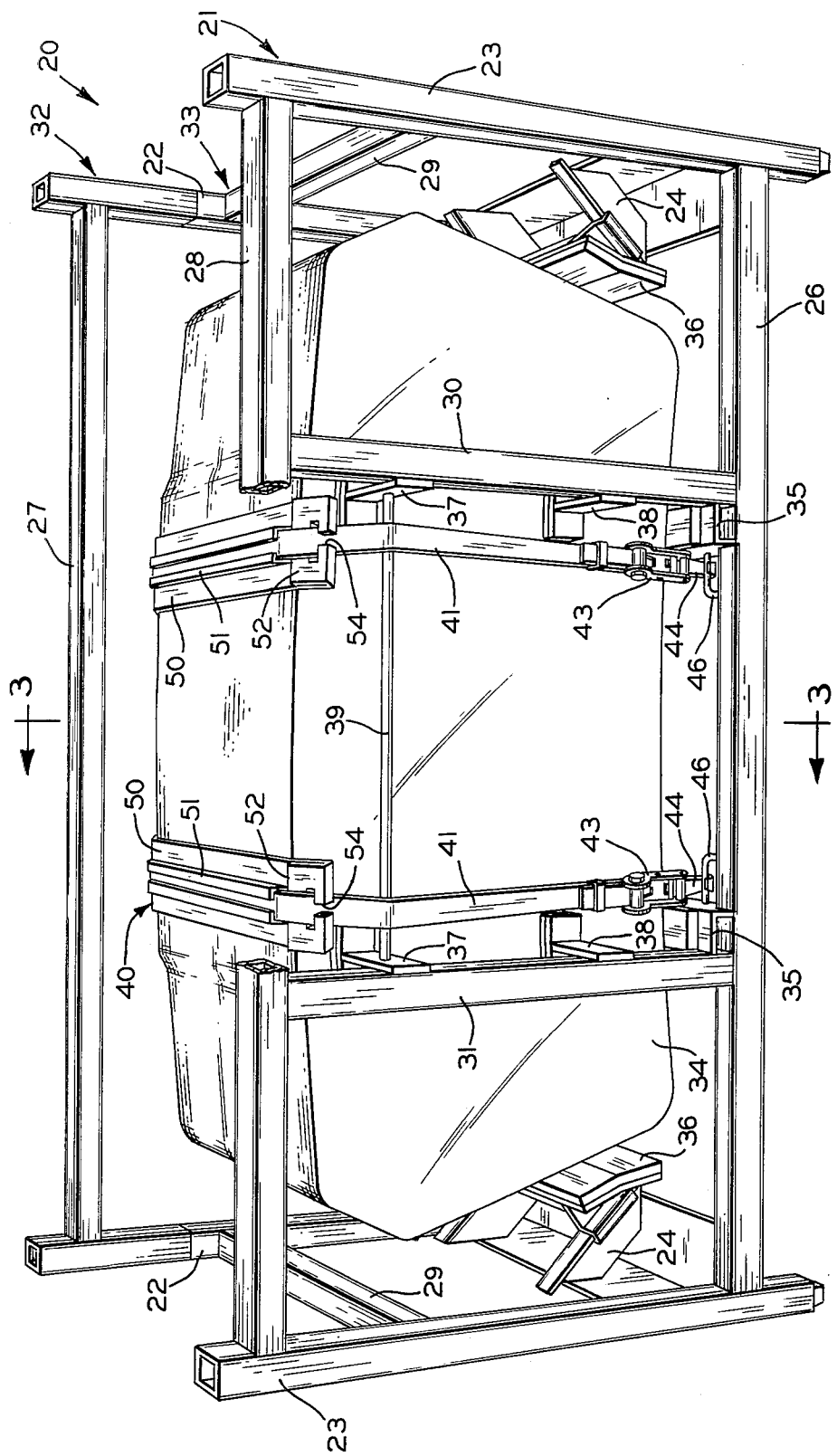
FIG. 2 is a perspective view of the rear of the shipping package with parts of the frame broken away.

Referring now to the drawings, and particularly to FIGS. 1 and 2, there is illustrated a composite shipping package constructed in accordance with the invention and designated in its entirety by the numeral 20. As disclosed, a rack 21 such as shown in the aforementioned U.S. Pat. No. 3,809,234, generally comprises an open frame in the form of a rectangular parallelpiped structure and includes a pair of vertical front corner posts 22, a pair of rear corner posts 23, horizontal end angle shaped support members 24, a lower pair of horizontal front and rear longitudinal rails 25 and 26, respectively, a pair of upper horizontal front and rear longitudinal rails 27 and 28, respectively, a pair of upper horizontal end rails 29, and two intermediate rear vertical posts 30 and 31 extending between the lower and upper longitudinal rails 26 and 28.

As illustrated in the drawings, the vertical corner post 22 at the front of the frame may be formed of two separable interfitting sections 32 and 33 so that a portion 32 of the frame can be readily removed and replaced on the rack so as to permit ready access for loading and unloading while allowing the racks to be stacked one upon another.

Within the above structure, a plurality of bent glass sheets 34, such as automotive windshields, are suitably contained for shipment or storage. As viewed in FIGS. 1 and 2, the glass sheets 34 are supported at their lower edges by a pair of spaced horizontal tubular members 35 extending between the lower longitudinal rails 25 and 26. A protective cushion of resilient non-abrasive material such as rubber is provided over the top wall of the members 35 for contacting the bottom edges of the sheets 34. The protective cushion adhered to the top wall has a tough flexible skin with a somewhat more resilient backing layer so as to withstand the wear imposed by the sharp glass edges.

Inclined brace members or saddles 36 covered with a cushioning material are mounted at each end of the rack for supporting the end edges of the glass sheet and holding the sheets against endwise movement. Each brace member 36 is adjustably positionable as disclosed in the aforementioned patent.

To maintain the sheets in an upright position at the rear of the shipping rack, an upper pair of vertically adjustable back braces 37 and a lower pair of back braces 38 are mounted on the intermediate vertical posts 30 and 31 so that they may accommodate sheets of different curvature. A bar 39 extends between the upper back braces 37 to join them as a unit and carry a hold-down apparatus 40 as will be hereinafter explained.

Generally stated, the glass sheets 34 are supported on their lower edges by the tubular members 35 and at their end edges by the brace members 36 and they are stacked in face-to-face relation with the rear unit against the upper and lower back braces 37 and 38. The glass sheets are secured against relative movement within all of the supporting members of the rack 21 by the adjustable unitized hold-down apparatus 40. Thus, the apparatus 40 includes a pair of hold-down straps 41, and each hold-down strap 41 has a hook 42 at one end and a buckle assembly 43 with an attached hook 44 at the opposite end to provide an adjustment for holding glass sheets of various sizes. Each hold-down strap 41 is secured to the rack frame at one end by engaging the hook 42 to a link 45 mounted on the frame as shown in FIG. 3. At the other end of the strap, the hook 44 is attached to an anchor ring 46. The buckle assembly 43 provides the adjustment to tighten or loosen the strap 41.

Of course, it is known that sheets of glass are more susceptible to being broken by forces applied to their planar surfaces than to their end edges. Thus, the hold-down apparatus 40, according to this invention, is designed to apply a downward force against the top edges of the glass sheets 34 to urge the sheets against the bottom tubular members 35, as well as uniformly urge the stack of sheets against the back braces 37 and 38. The forces applied by each of the straps 41 are transmitted to the stack of sheets by a novel arrangement of a pair of top pressure members 47 and front upper and lower pressure members 48 and 49, respectively, which are interconnected with the straps 41.

Each top pressure member 47 comprises an elongated pad 50 of, for example, corrugated plastic or fiber sheet material, and may include an elongated rigid tubular runner 51 of plastic or wood which extends along the pad and through which the strap 41 is threaded. As shown in FIG. 4, the pad 50 is L-shaped and provided with raised portions or shoulders 52 and 53 adjacent its ends. Further, each end of the pad is provided with an aperture such as T-shaped slot 54 through which the strap 41 can be conveniently threaded. As best shown in FIG. 3, the rear end of the runner 51 bears against the shoulder 52 to firmly seat the short leg 55 of the L-shaped pad against the front face of the stack of glass sheets.

Each front pressure member 48 or 49 comprises an elongated rigid tubular element 56 having elongated slots 57 for receiving the straps 41. The upper or first pressure member 48 extends horizontally between the belts 41, bears against the front face of the short leg 55 and is seated on the shoulders 53 thereof which hold it in its prescribed position. The lower or second pressure member 49 extends horizontally between the belts 41 adjacent the bottom edge of the stack of glass sheets. In this described arrangement, it has been found that a torque of about 70 foot-pounds can be safely applied to the straps 41 to firmly secure the glass articles to the rack 21. As previously pointed out, when individual banding straps are used to secure the sheets of glass to the rack only about 25 foot-pounds of torque can be safely applied to the straps. Thus, it is apparent that the forces applied by the straps 41 via the pressure pads 47 and particularly the front pressure members 48 and 49 are more uniformly distributed on the stack of glass sheets and firmly hold the stack against the bottom and back braces of the rack 21.

Paperboard or foam cushioning sheets 58 are used between the adjacent glass sheets to prevent each sheet from being in contact with, and marring the surfaces of, the adjacent glass sheets. Additional cushioning sheets 59, as shown in FIG. 1, may be used between the first glass sheet of the stack at the front of the rack and the first and second pressure members of the hold-down apparatus 40. Also, the sheets 58 may be used between the first glass sheet of the stack at the rear of the shipping rack and the upper and lower back braces 37 and 38. These sheets offer a more cushioned support from the hold-down apparatus and the back braces for the stacked glass sheets and further reduce the possibility of damage to the shipment.

Most present day windshields have a greater length at their base than at the top due to the current trend of automotive designs favoring inwardly inclined corner posts. Since these windshield units are larger at their base, they are more easily supported in an inverted position on the shipping rack. Thus, in the present invention, the tops of the units are supported upon the horizontal tubular member 35 and the bases of the windshields are held by the adjustable hold-down apparatus 40 and the inclined brace members 36 engage the ends or sides of the units.

It is known that automotive windshields generally are more tapered at their end edges and curved throughout their length, while truck windshields are almost flat in the central region and have less taper at the end edges. To accommodate both the automobile windshield configuration shown in FIG. 6, and the truck windshield configuration shown in FIGS. 1 and 2, the top pad 50 is modified as shown in FIG. 5. Thus, the shoulder 53' on the short leg 55 is provided with multi-planar surfaces, that is, surface portions inclined at different angles as shown in FIGS. 5 and 6. One portion of the supporting surface is adapted to seat and support the upper pressure member 48 in a horizontal position. Since the upper back braces 37, the holddown apparatus 40, and the inclined brace members 36 are adjustable, different sizes and shapes of windshield units other than the configuration shown in FIGS. 1 and 6, can also be accommodated.

After the shipping rack is loaded with glass sheets and the sheets are secured in the manner outlined above, it is finally prepared for transporting by assembling the front removable upper section 32 with the front bottom section 33. The loaded shipping package can then be moved by forklift into a truck or railroad car for transportation or to an area of temporary storage. In any event, several packages can be stacked one above the other.

It is to be understood that the forms of the invention herewith shown and described are to be taken as preferred embodiments only of the same, and that various changes in the shape, size, and arrangement of parts may be resorted to without departing from the spirit of the invention.

I claim:
1. In a composite shipping package including a shipping rack containing a plurality of up-standing sheets of glass having an open, substantially L-shaped frame upon which said sheets are supported on edge and an adjustable tie down apparatus, the improvement comprising
   a. a pair of spaced apart L-shaped pads each having a first elongated leg lying transversely across the top edges of said sheets and a second leg lying along the front face of the outer one of said sheets;
   b. a pair of banding straps wherein each of said straps is connected to one of said pads for holding said pad on said top edges of said sheets;
   c. a first pressure member whose ends are connected to and extend between said straps and wherein the ends of the pressure member bear against said second leg of each said pad and,
   d. means securing said straps to said rack under tension for applying pressure on the ends of said pressure member whereby the pressure applied by each said strap to said pressure member is uniformly transmitted to said plurality of sheets to hold said sheets on said rack.

2. A composite shipping package as claimed in claim 1, including a second pressure member spaced below said first pressure member and which is connected to and extends between said straps.

3. A composite shipping package as claimed in claim 2, wherein said second leg of each said pad includes a shoulder on which said first pressure member is seated.

4. A composite shipping package as claimed in claim 3, wherein each said shoulder on each said second leg horizontally seats said first pressure member adjacent the top edges of said sheets and said second pressure member is disposed substantially parallel thereto adjacent the bottom edges of said sheets.

5. A composite shipping package as claimed in claim 1, including a runner which is disposed between each said banding strap and its associated pad.

6. A composite shipping package as claimed in claim 5, wherein the free end of said first leg of said pad includes a shoulder which seats an end of its associated runner.

7. A composite shipping package as claimed in claim 1, including means for connecting each said pad to its associated banding strap which comprises an aperture in each end of each said pad through which said banding strap passes.

8. A composite shipping package as claimed in claim 1, including cushioned spacing members positioned between adjacent sheets to separate each said sheet from the next adjacent sheet.

9. In a composite shipping package including a shipping rack containing a plurality of up-standing sheets of glass having an open, substantially L-shaped frame upon which said sheets are supported on edge and an adjustable tie down apparatus, the improvement comprising
   a. a pair of spaced apart L-shaped pads each having a first elongated leg lying transversely across the top edges of said sheets and a second leg lying along the front face of the outer one of said sheets;
   b. a pair of banding straps wherein each of said straps is connected to one of said pads for holding said pad on said top edges of said sheets;
   c. means for connecting each pad to its associated banding strap which comprises a T-shaped slot in each end of each said pad and through which said banding strap passes,
d. a first pressure member whose ends are connected to and extend between said straps and wherein the ends of the pressure member bear against said second leg of each said pad and,
e. means securing said straps to said rack under tension for applying pressure on the ends of said pressure member whereby the pressure applied by each said strap to said pressure member is uniformly transmitted to said plurality of sheets to hold said sheets on said rack.

10. In a composite shipping package including a shipping rack containing a plurality of up-standing sheets of glass having an open, substantially L-shaped frame upon which said said sheets are supported on edge and an adjustable tie down apparatus, the improvement comprising
 a. a pair of spaced apart L-shaped pads each having a first elongated leg lying transversely across the top edges of said sheets and a second leg lying along the front face of the outer one of said sheets;
 b. a pair of banding straps wherein each of said straps is connected to one of said pads for holding said pad on said top edges of said sheets;
 c. a first pressure member whose ends are connected to and extend between said straps and wherein the ends of the pressure member bear against said second leg of each said pad,
 d. means for connecting each end of said pressure member to one of said banding straps which comprises an aperture in each end of said member and through which a banding strap passes, and
 e. means securing said straps to said rack under tension for applying pressure on the ends of said pressure member whereby the pressure applied by each said strap to said pressure member is uniformly transmitted to said plurality of sheets to hold said sheets on said rack.

11. A composite shipping package as claimed in claim 10, wherein each aperture in said pressure member comprises a T-shaped slot.

* * * * *